United States Patent
Kellner

[15] 3,650,192
[45] Mar. 21, 1972

[54] FOLLOW FOCUS BELLOWS FOR PHOTOGRAPHIC CAMERAS

[72] Inventor: Ferdinand Kellner, 8941 Hart 14 1/4 near Memmingen/Bavaria, Germany

[22] Filed: Mar. 17, 1969
[21] Appl. No.: 807,808

[30] Foreign Application Priority Data

Apr. 6, 1968 Germany............P 17 72 163.0

[52] U.S. Cl.............................95/45, 355/55
[51] Int. Cl...............................G03b 3/02
[58] Field of Search..........95/45, 32; 350/70, 75; 355/55

[56] References Cited

UNITED STATES PATENTS

| | | | |
|---|---|---|---|
| 2,684,020 | 7/1954 | Kellner | 95/39 X |
| 2,249,229 | 7/1941 | Rogers | 95/45 |
| 2,607,265 | 8/1952 | Petrucelli | 95/45 |

FOREIGN PATENTS OR APPLICATIONS 450,147  4/1968  Switzerland..................95/45

Primary Examiner—Samuel S. Matthews
Assistant Examiner—Russell E. Adams, Jr.
Attorney—Holman & Stern

[57] ABSTRACT

A focusing means for a bellows-type photographic camera, having both coarse and fine adjustment means. An outer guide sleeve is longitudinally movable relative to a stationary central spindle by means of a fine-adjustment screw thread; the forward end of the bellows includes a sliding carriage which may be slidably movable longitudinally relative to the guide sleeve for coarse adjustment, and which may be selectively locked relative to the guide sleeve by a radial set-screw to thereby partake of the fine-adjustment movement of the sleeve.

8 Claims, 3 Drawing Figures

INVENTOR
FERDINAND KELLNER

FOLLOW FOCUS BELLOWS FOR PHOTOGRAPHIC CAMERAS

The present invention relates to a focussing means for a follow focus bellows for photographic cameras with a device for shifting the bellows front end carrying the lens along one or more guide rods rigidly connected with the camera, whereby the bellows front end is supported on the guide rods by means of a longitudinally shiftable slide carriage which may be selectively fixed at any desired position.

While for a sharp focusing of the lens in a fixed-lens or non-folding camera, generally a screw thread with some turns of threads is sufficient, a considerably greater expenditure is necessary for a corresponding device for shifting the lens in a follow focus bellows, e.g., in a folding camera, because of the greater focussing range. Generally rail-type guide rods are provided on which the bellows front end is shiftable together with the lens for adjusting the size of the picture section and also for the sharp focus adjustment. The shifting movement of the camera bellows front end can be obtained in different manners, e.g., by a cog wheel cooperating with a rack arranged parallel to the guide rods or also by threaded spindle arrangements extending parallel to the optical axis and allowing also an adjustment of the camera front.

The known devices are not entirely satisfactory in operation. If the camera front end is guided in its longitudinal movement free of clearance or nearly free of clearance by the appertaining guide rods, it is movable only with great effort due to the great degree of friction. With some clearance and thus easy motion, however, the adjusting exactness will then suffer because the rigid mutual cooperation of the lens with the camera is then no longer guaranteed.

In the known devices the manufacturing expenditure for the production of the guides, the adjustment devices and the appertaining components is considerable. There is frequently also the danger with the known devices that these high-class components which can not be adequately protected are damaged in their use.

It is an object of the invention to provide a focussing means for a follow focus bellows for the indicated purpose which can be manufactured on the one hand with relatively little expenditure and which allows, on the other hand, in spite of this an exact and precise adjustment of the lens relative to the camera. A further object of the invention is to assure a secure fixing of the camera front during the exposure. And also the operating expenditure shall be as low as possible, and finally it is an object of the invention to make the arrangement in such a way that also the more sensitive parts are protected during the use of the camera so that a long service life is reached.

The invention consists of a focussing means for a follow focus bellows for photographic cameras with a feature for shifting the camera front end carrying the lens axially along guide rods rigidly connected with the camera, whereby the camera front end is supported by means of a shiftable and fixable slide carriage longitudinally movable on the guide rods. The present invention is characterized by the fact that the slide carriage is shiftable and fixable on a guide, that a fine adjustment device is provided for the longitudinal shifting of the guide with the slide carriage along the guide rods rigidly connected with the camera, and that the guide is supported by the guide rods over almost the full length of the latter.

Thus the invention provides a coarse adjustment device and a fine adjustment device. The coarse adjustment device serves particularly for selecting the picture section or size. This coarse adjustment device is arranged between the slide carriage and the guide and, as the slide carriage is adjustable on the guide, it can be of easy action during the shifting movement. It is clear that such a shifting device can be produced with little expenditure.

But also the fine adjustment device can be produced according to the invention with little expenditure. The fine adjustment device is provided in the device according to the invention between the guide carrying the slide carriage and the camera front end, and the guide rods rigidly connected with the camera. The guide is supported on the guide rods over nearly their full length. This great supporting length guarantees with little production expenditure an exact mutual cooperation, without the use of special fixing devices. As furthermore the fine adjustment device needs only a small adjustment range, only a few parts, or only short pieces of the components, must be formed to a high degree of precision.

In a preferred embodiment of the invention it is contemplated to configurate the guide as a many-sided sleeve carrying on its outer side the slide carriage and surrounding the essential part of the fine adjustment device. Alternatively, if desired, is also possible to carry out the invention using several parallel tube-shaped parts on which the slide carriage is sliding. Thereby it is particularly favorable that commercially available precision tubes can be used which do not need any particular expensive working taking into consideration the reflections according to the invention. The guide sleeve surrounds the more sensitive parts and protects them against exterior influences.

It is particularly favorable if a spring is provided which presses the guide sleeve axially against the fine adjustment device. Such a spring eliminates any clearance between the single components. The fine adjustment device can then consist, according to the invention, essentially of a spindle and an adjustable spindle nut, which spindle nut acts on the sleeve against the power of the spring. The spindle nut is preferably provided on the free extremity of the spindle so that this latter can be easily operated from the outside. The other extremity of the spindle is thereby rigidly connected with the camera.

In a proved configuration of the invention the spindle is surrounded by the screw-shaped spring and the spindle and the spring are arranged in the interior of an intermediate tube, which is rigidly connected with the spindle and the camera. It is, in this connection, recommendable if between the intermediate tube and the guide sleeve spring elements acting in a generally radial direction are provided eliminating the clearance between the guide sleeve and the intermediate sleeve.

According to a particular feature of the invention, the intermediate sleeve is also configurated as a many-sided tube, and leaf springs are provided along it adjacent to one edge, which act from the interior on the guide sleeve.

For the configuration of the device for fixing the slide carriage on the guide sleeve, the invention proposes particularly a cylindrical bolt of plastic material guided in the slide carriage, which can be pressed radially against an edge of the sleeve. The use of such a cylindrical plastic material bolt has the advantage that any damage to the guide sleeve is excluded even if there is tried a shifting of the camera front with the slide carriage without releasing the fixing device.

In the drawings, an embodiment of the invention is shown diagrammatically.

Figure 1:
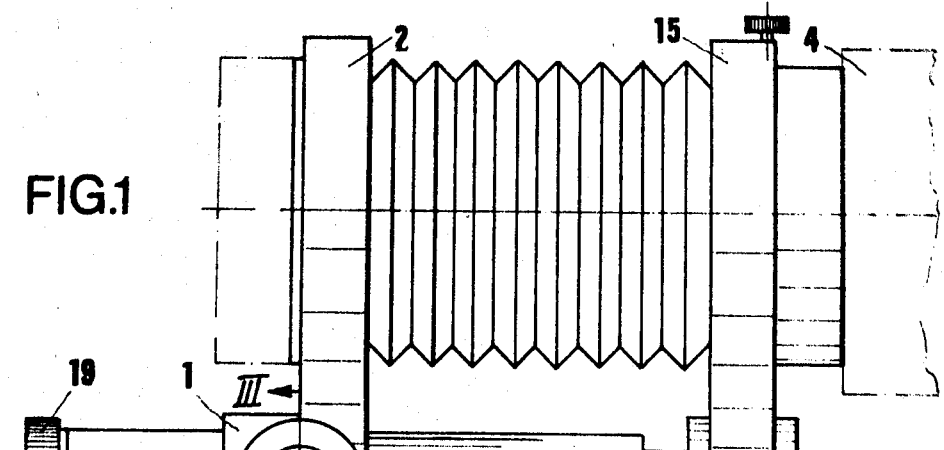
FIG. 1 is a lateral view of a follow focus bellows according to the invention.

The follow focus bellows consists as known per se essentially of the bellows front end 2 carrying the not shown lens and the camera front end 15 for holding the camera body 4. With the camera front end 15 or the camera body 4, respectively, the guide sleeve 3 is connected on which the sliding carriage 1, secured to the bellows front end 2, is longitudinally adjustable in the direction of the double arrow 16.

Figure 2:
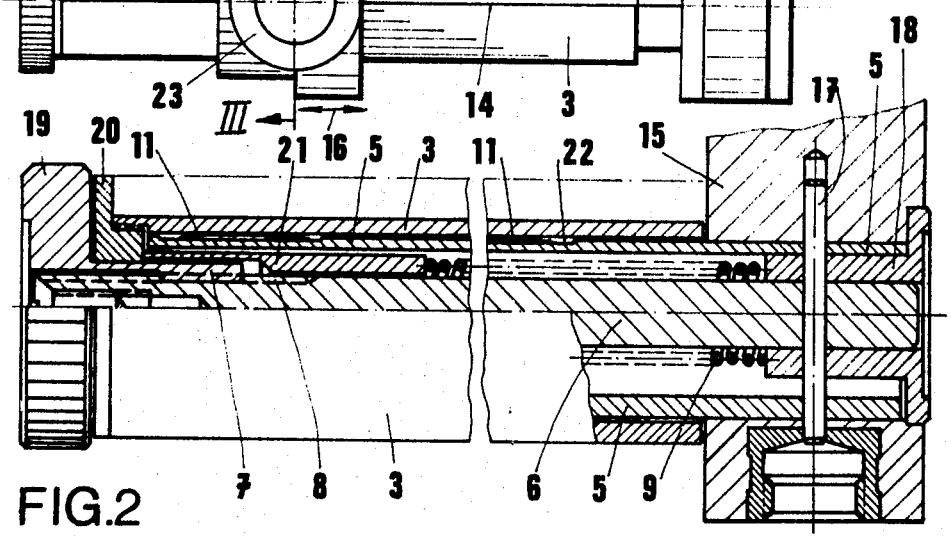
FIG. 2 shows a longitudinal section through the essential components of the device according to the invention corresponding to the section line II — II of FIG. 3, whereby the slide carriage with the camera front is left away.

As shown particularly in FIG. 2, the spindle 6, the intermediate piece 18 and the intermediate sleeve 5 are all stationary and are rigidly connected with the camera front end 15 by means of the transverse fastening bolt 17 passing therethrough. The fine adjustment thread 8 is cut on the opposite or forward free extremity of the spindle 6. This thread 8 cooperates with the spindle nut 7 which can be fastened on the head 19. The spindle nut 7 presses on an intermediate ring 20, which is secured to the guide sleeve 3, particularly by soldering or other means in such a way that the guide sleeve 3 is taken along in the movement of the intermediate ring 20.

Within the intermediate sleeve 5 a distance sleeve 21 is provided which engages with its one or forward extremity the intermediate ring 20 and against the other or rearward end of which the spring 9 is acting. This forward end of compression spring engages at its opposite or rear end the intermediate piece 18 and tends thus to press the intermediate ring 20 and guide sleeve 3 against the head 19 of spindle nut 7.

It is clear that in this way by rotational adjustment of the spindle nut 7 an exact fine adjustment of the guide sleeve 3 is possible in the axial direction.

Figure 3:
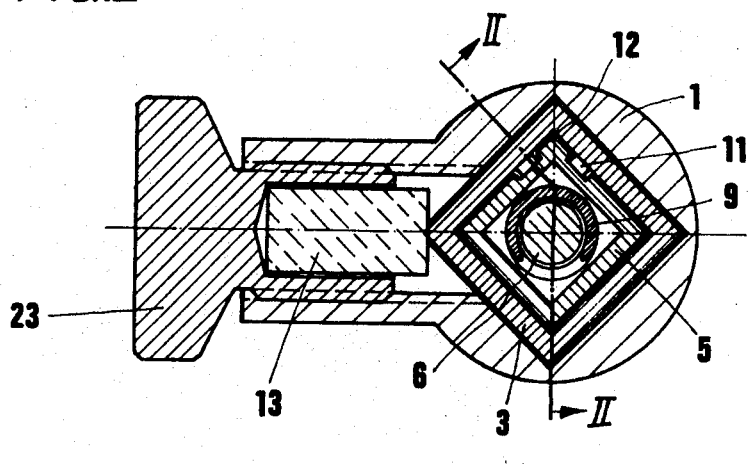
FIG. 3 shows a section through the essential parts of the device according to the invention, along the line III — III of FIG. 1.

In order to eliminate the clearance or radical play between the intermediate sleeve 5 and the guide sleeve 3, leaf springs 11 are inserted in recesses 22 of the guide sleeve 5 as this is shown particularly in FIG. 3 which shows a view with partial section through the intermediate sleeve 5. The leaf springs 11 are, thereby, arranged in the vicinity of and adjacent to the longitudinal edge 12 and bear against the inner surface of the guide sleeve 3 to take up such play.

As is shown in FIG. 1, a generally radial locking screw 23 is arranged in the sliding carriage 1 which screw acts against the edge 14 of the guide sleeve 3. The plastic material bolt 13 is arranged between the locking screw 23 and the edge 14. It should be appreciated that when this locking screw 23 is loosened, the sliding carriage 1 and hence the front end 2 of the bellows may be freely moved in the longitudinal direction relative to the guide sleeve 3, thus permitting a coarse adjustment of the bellows. Once this coarse adjustment has been achieved, the locking screw 23 may then be tightened to lock the sliding carriage 1 immobile relative to the guide sleeve 3, and the head 19 of spindle nut 7 rotated to achieve a fine-adjustment longitudinal movement of the guide sleeve 3, and hence of the sliding carriage 1, relative to the stationary spindle 6.

As is clear from a comparison of FIG. 1 with FIG. 2, the guide sleeve is shifted in the representation according to FIG. 1 to its adjustment position in which it has the greatest distance from the camera 4, while in the presentation according to FIG. 2, the most rearward position of the guide sleeve 3 is shown.

The guide sleeve 3 and the intermediate sleeve 5 are shown as comprising rectangular tubes of square section. The intermediate ring 20, the distance sleeve 21 and the intermediate piece 18 are, however, bodies of rotation.

I claim:

1. Focussing means for a follow focus bellows for photographic cameras wherein the rear end of the bellows is fixed to the camera, comprising an elongated stationary spindle secured to the camera; a guide sleeve mounted on said spindle and adapted for longitudinal movement relative thereto; means for effecting fine-adjustment longitudinal movement of said guide sleeve relative to said spindle; a sliding carriage secured to the front end of the bellows and mounted on said guide sleeve for longitudinal sliding movement relative to said sleeve; and means for locking said carriage stationary relative to said sleeve; said guide sleeve extending substantially the full length of said spindle and being supported along its full length thereby.

2. A focusing means as defined in claim 1, further comprising an intermediate sleeve surrounding and spaced from said spindle; said intermediate sleeve being secured to said spindle adjacent to one end thereof, said guide sleeve being slidably supported by said intermediate sleeve along substantially the full length of said guide sleeve.

3. A focusing means as defined in claim 2, wherein said guide sleeve comprises a many-sided cross-section and surrounds said intermediate sleeve, said spindle and said means for effecting fine-adjustment longitudinal movement of said guide sleeve, and said sliding carriage substantially surrounding said guide sleeve.

4. A focussing means as defined in claim 2, wherein said means for effecting fine-adjustment longitudinal movement of said guide sleeve comprises a threaded spindle nut, said spindle having a threaded portion at the end thereof spaced from the end secured to said intermediate sleeve and cooperating with said spindle nut, said spindle nut bearing against said guide sleeve, whereby rotation of said spindle nut will move said spindle nut and said guide sleeve axially with respect to said spindle.

5. A focussing means as defined in claim 4, further comprising a compression spring surrounding said spindle and biasing said guide sleeve towards said spindle nut.

6. A focusing means as defined in claim 5, further comprising spring means disposed between said intermediate sleeve and said guide sleeve to eliminate radial play between said sleeves.

7. A focussing means as defined in claim 1, wherein said means for locking said carriage relative to said guide sleeve comprises a generally radially extending locking screw threadedly received within said sliding carriage and engaging an exterior edge of said guide sleeve.

8. A focussing means as defined in claim 7, wherein said locking screw comprises a plastic material.

* * * * *